United States Patent
Hu et al.

(10) Patent No.: US 12,022,312 B2
(45) Date of Patent: Jun. 25, 2024

(54) MINIMIZATION OF DRIVE TESTS CONFIGURATION METHOD AND BASE STATION

(71) Applicant: HUAWEI TECHNOLOGIES CO., LTD., Guangdong (CN)

(72) Inventors: Xingxing Hu, Shanghai (CN); Hongping Zhang, Shenzhen (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 315 days.

(21) Appl. No.: 17/401,535

(22) Filed: Aug. 13, 2021

(65) Prior Publication Data

US 2021/0377773 A1 Dec. 2, 2021

Related U.S. Application Data

(63) Continuation of application No. PCT/CN2020/075186, filed on Feb. 14, 2020.

(30) Foreign Application Priority Data

Feb. 15, 2019 (CN) .......................... 201910117709.2

(51) Int. Cl.
*H04W 24/10* (2009.01)
*H04W 24/02* (2009.01)
(Continued)

(52) U.S. Cl.
CPC ........... *H04W 24/10* (2013.01); *H04W 24/02* (2013.01); *H04W 24/08* (2013.01); *H04W 76/16* (2018.02)

(58) Field of Classification Search
CPC ..... H04W 24/10; H04W 76/16; H04W 24/02; H04W 24/08
See application file for complete search history.

(56) References Cited

U.S. PATENT DOCUMENTS

| 11,317,302 B2* | 4/2022 | Hong .................. H04W 24/10 |
| 11,445,398 B2* | 9/2022 | Li ....................... H04L 41/0803 |

(Continued)

FOREIGN PATENT DOCUMENTS

| CN | 102111791 A | 6/2011 |
| CN | 102457890 A | 5/2012 |

(Continued)

OTHER PUBLICATIONS

Notice of Allowance issued in CN201910117709.2, dated Jan. 12, 2022, 4 pages.

(Continued)

*Primary Examiner* — Chandrahas B Patel (57) ABSTRACT

Embodiments of this application disclose a minimization of drive tests (MDT) configuration method, to improve accuracy of a cell measurement result. The method in the embodiments of this application includes: receiving, by a base station, MDT configuration information sent by a core network or an operation, administration, and maintenance (OAM) network management system, where the MDT configuration information includes first beam configuration information; and sending, by the base station, an MDT measurement configuration message to UE based on the MDT configuration information, where the MDT measurement configuration message includes second beam configuration information, and the second beam configuration information is the same as the first beam configuration information or the second beam configuration information is configuration information obtained after the first beam configuration information is processed.

15 Claims, 7 Drawing Sheets

(51) Int. Cl.
*H04W 24/08* (2009.01)
*H04W 76/16* (2018.01)

(56) References Cited

U.S. PATENT DOCUMENTS

| | | | |
|---|---|---|---|
| 2012/0281573 A1 | 11/2012 | Kazmi et al. | |
| 2013/0114446 A1 | 5/2013 | Liu et al. | |
| 2014/0153482 A1 | 6/2014 | Schmidt et al. | |
| 2014/0162655 A1 | 6/2014 | Hong et al. | |
| 2015/0215179 A1 | 7/2015 | Mondal et al. | |
| 2015/0222345 A1 | 8/2015 | Chapman et al. | |
| 2019/0007123 A1 | 1/2019 | Rune et al. | |
| 2020/0068462 A1* | 2/2020 | Zetterberg | H04W 36/0058 |
| 2021/0360449 A1* | 11/2021 | Kim | H04W 24/08 |

FOREIGN PATENT DOCUMENTS

| | | | |
|---|---|---|---|
| CN | 102595482 A | 7/2012 | |
| CN | 102761863 A | 10/2012 | |
| CN | 103385019 A | 11/2013 | |
| CN | 103533524 A | 1/2014 | |
| CN | 103634838 A | 3/2014 | |
| CN | 105900475 A | 8/2016 | |
| CN | 107005342 A | 8/2017 | |
| CN | 108401510 A | 8/2018 | |
| CN | 108924949 A | 11/2018 | |
| EP | 2833666 A1 | 2/2015 | |
| EP | 3627876 A1 | 3/2020 | |
| EP | 3915292 A1 | 12/2021 | |
| GB | 2532067 A | 5/2016 | |
| WO | 2015168861 A1 | 11/2015 | |
| WO | 2016012053 A1 | 1/2016 | |
| WO | 2018084776 A1 | 5/2018 | |
| WO | 2018106175 A1 | 6/2018 | |
| WO | 2018117248 A1 | 6/2018 | |
| WO | 2018136184 A1 | 7/2018 | |
| WO | 2018228240 A1 | 12/2018 | |
| WO | 2020034587 A1 | 2/2020 | |
| WO | 2020164564 A1 | 8/2020 | |

OTHER PUBLICATIONS

Office Action issued in CN 201910117709.2, dated Mar. 24, 2021, 12 pages.
Office Action issued in CN 201910117709.2, dated Aug. 13, 2021, 9 pages.
International Search Report and Written Opinion issued in PCT/CN2020/075186, dated May 12, 2020, 9 pages.
Extended European Search Report issued in EP20755123.5, dated Feb. 16, 2022, 13 pages.

* cited by examiner

MINIMIZATION OF DRIVE TESTS CONFIGURATION METHOD AND BASE STATION

CROSS-REFERENCE TO RELATED APPLICATIONS

This application is a continuation of International Application No. PCT/CN2020/075186, filed on Feb. 14, 2020, which claims priority to Chinese Patent Application No. 201910117709.2, filed on Feb. 15, 2019. The disclosures of the aforementioned applications are herein incorporated by reference in their entireties.

TECHNICAL FIELD

This application relates to the field of communication technologies, and in particular, to a minimization of drive tests configuration method and a base station.

BACKGROUND

Drive test is the most frequently used test method for road radio signals in the communication industry. In the minimization of drive tests (MDT) technology, a user terminal performs measurement reporting and terminal measurement data is automatically collected to detect and resolve problems and faults in a wireless network.

In new radio (NR) of fifth generation (5G) mobile communication, an NR base station (gNB) connected to a 5G core network (5GC) may support a large-scale antenna array, and be used for directional signal transmission or reception with the beamforming technology. The beamforming technology may focus energy of a radio signal to form a directional beam. In MDT measurement, UE in a connected mode may obtain a cell measurement result by measuring a plurality of beams.

In the conventional technology, measurement configurations of user equipment (UE) connected to a same base station are different. The UE may measure different beams, and configuration parameters for obtaining cell measurement results based on beam measurement results are also different. If cell measurement results are obtained based on different measurement configurations of base stations and then cell radio signals of the base stations are uniformly analyzed, accuracy is relatively low.

SUMMARY

Embodiments of this application provide a minimization of drive tests (MDT) configuration method, to improve accuracy of a cell measurement result.

A first aspect of the embodiments of this application provides a minimization of drive tests (MDT) configuration method, including: receiving, by a base station, MDT configuration information sent by a core network or an operation, administration, and maintenance (OAM) network management system, where the MDT configuration information includes first beam configuration information; and sending, by the base station, an MDT measurement configuration message to UE based on the MDT configuration information, where the MDT measurement configuration message includes second beam configuration information, and the second beam configuration information is the same as the first beam configuration information or the second beam configuration information is configuration information obtained after the first beam configuration information is processed.

To obtain terminal measurement data, a core network or an operation, administration, and maintenance network management system may send MDT configuration information to a base station, where the MDT configuration information is parameter information required for MDT measurement. In the embodiments of this application, the MDT configuration information includes first beam configuration information. After obtaining the MDT configuration information, the base station may generate an MDT measurement configuration message based on the MDT configuration information, where the MDT measurement configuration message includes second beam configuration information, and the second beam configuration information is the same as the first beam configuration information or the second beam configuration information is configuration information obtained after the first beam configuration information is processed. The base station sends the MDT measurement configuration message to UE, to indicate the UE to perform MDT measurement and report an MDT measurement result. All MDT measurement results reported by the UE are measurement results based on the same beam configuration information. Therefore, analysis accuracy may be improved if cell radio signals of the base station are uniformly analyzed based on the measurement results.

In a possible implementation of the first aspect, the first beam configuration information includes one or more of: a reference signal type, an average quantity of beams of a reference signal, or a reference signal combination threshold.

In the MDT configuration method provided in the embodiments of this application, specific content included in the first beam configuration information is described, and feasibility of the solution is improved.

In a possible implementation of the first aspect, the second beam configuration information includes one or more of: a reference signal type, reference signal configuration information, an average quantity of beams of a reference signal, or a reference signal combination threshold.

In the MDT configuration method provided in the embodiments of this application, specific content included in the second beam configuration information is described, and feasibility of the solution is improved.

In a possible implementation of the first aspect, the MDT configuration information includes area information; and the base station determines, based on the area information, the UE that performs MDT measurement.

According to the MDT configuration method provided in the embodiments of this application, if the MDT configuration information includes the area information, the base station determines, based on the area information, the UE that performs MDT measurement, thereby improving completeness of solution implementation.

In a possible implementation of the first aspect, after the sending, by the base station, an MDT measurement configuration message to UE based on the MDT configuration information, the method further includes: receiving, by the base station, an MDT measurement result sent by the UE, where the MDT measurement result is obtained after measurement is performed based on the second beam configuration information; and sending, by the base station, the MDT measurement result to a trace collection entity (TCE).

According to the MDT configuration method provided in the embodiments of this application, after receiving the MDT measurement result sent by the UE, the base station may report the measurement result to the TCE, thereby improving completeness of solution implementation.

In a possible implementation of the first aspect, the MDT configuration information includes indication information of signal quality measurement on a master base station and a secondary base station; and the method further includes: triggering, by the base station, the UE to report signal quality measurement results of the master base station and the secondary base station, where the UE is dually connected to the master base station and the secondary base station.

According to the MDT configuration method provided in the embodiments of this application, if the MDT configuration information includes the indication information of signal quality measurement on the master base station and the secondary base station, the base station may obtain the signal quality measurement results of the master base station and the secondary base station. Then, signal coverage statuses of the master base station and the secondary base station when the UE is in a same location are obtained.

In a possible implementation of the first aspect, after the triggering, by the base station, the UE to report signal quality measurement results of the master base station and the secondary base station, the method further includes: reporting, by the base station, the signal quality measurement results of the master base station and the secondary base station to the trace collection entity (TCE).

According to the MDT configuration method provided in the embodiments of this application, the base station may report the received indication information of signal quality measurement on the master base station and the secondary base station to the TCE. This provides a feasible manner in which the core network or OAM indicates to report the indication information of signal quality measurement on the master base station and the secondary base station.

In a possible implementation of the first aspect, the method further includes: indicating, by the base station, a secondary base station of the UE to deliver periodic measurement or A2 event measurement, where the UE is dually connected to a master base station and the secondary base station; receiving, by the base station, a signal quality measurement result sent by the secondary base station; and reporting, by the base station, the signal quality measurement result to the TCE.

According to the MDT configuration method provided in the embodiments of this application, the master base station in the dual connectivity scenario may indicate the secondary base station to measure signal quality, and report the measurement results to the TCE. This provides a feasible manner of obtaining signal quality measurement results of the master base station and the secondary base station.

A second aspect of the embodiments of this application provides a minimization of drive tests (MDT) configuration method, including: generating, by a base station, MDT configuration information based on a preset configuration rule, where the MDT configuration information includes beam configuration information; sending, by the base station, an MDT measurement configuration message to UE based on the MDT configuration information, where the MDT measurement configuration message includes the beam configuration information; receiving, by the base station, an MDT measurement result sent by the UE, where the MDT measurement result is obtained after measurement is performed based on the MDT measurement configuration message; and reporting, by the base station, the MDT configuration information and the measurement result to a trace collection entity (TCE).

The embodiments of this application provide a manner in which the base station generates, according to the preset rule, the MDT configuration information including the beam configuration information without being triggered by a core network or OAM and reports the MDT configuration information and the measurement result to the trace collection entity (TCE). All MDT measurement results reported by the UE may be obtained based on the same beam configuration information. Therefore, analysis accuracy may be improved if the TCE performs unified analysis on cell radio signals of the base station based on the measurement results and an MDT measurement configuration.

In a possible implementation of the second aspect, the beam configuration information includes one or more of: a reference signal type, reference signal configuration information, an average quantity of beams of a reference signal, and a reference signal combination threshold.

In the MDT configuration method provided in the embodiments of this application, specific content included in beam configuration information is described, thereby improving feasibility of the solution.

A third aspect of the embodiments of this application provides a minimization of drive tests (MDT) configuration method, including: obtaining, by a base station, MDT configuration information, where the MDT configuration information includes a power headroom measurement configuration; sending, by the base station, an MDT measurement configuration message to UE based on the MDT configuration information, where the MDT measurement configuration message includes the power headroom measurement configuration; receiving, by the base station, power headroom information reported by the UE, where the UE is dually connected to a master base station and a secondary base station; obtaining, by the base station, a correspondence between cell indexes of the master base station and the secondary base station of the UE and a physical cell identifier (PCI) or a cell global identifier (CGI); and sending, by the base station, the power headroom information and the correspondence to a TCE.

According to the MDT configuration method provided in the embodiments of this application, the master base station may obtain the correspondence between the cell index of the secondary base station and the physical cell identifier (PCI) or cell global identifier (CGI), and report the power headroom information and the correspondence. In this way, the TCE can analyze the power headroom information corresponding to the cell.

A fourth aspect of the embodiments of this application provides an MDT measurement apparatus, including: a receiving unit, configured to receive MDT configuration information sent by a core network or an operation, administration, and maintenance (OAM) network management system, where the MDT configuration information includes first beam configuration information; and a sending unit, configured to send an MDT measurement configuration message to UE based on the MDT configuration information, where the MDT measurement configuration message includes second beam configuration information, and the second beam configuration information is the same as the first beam configuration information or the second beam configuration information is configuration information obtained after the first beam configuration information is processed.

In a possible implementation of the fourth aspect, the receiving unit is further configured to receive an MDT measurement result sent by the UE, where the MDT measurement result is obtained after measurement is performed based on the second beam configuration information; and send, by the base station, the MDT measurement result to a trace collection entity (TCE).

In a possible implementation of the fourth aspect, the apparatus further includes: a triggering unit, configured to trigger the UE to report signal quality measurement results of a master base station and a secondary base station, where the UE is dually connected to the master base station and the secondary base station.

In a possible implementation of the fourth aspect, the sending unit is further configured to report the signal quality measurement results of the master base station and the secondary base station to the trace collection entity (TCE).

In a possible implementation of the fourth aspect, the apparatus further includes: an indication unit, configured to indicate a secondary base station of the UE to deliver periodic measurement or A2 event measurement, where the UE is dually connected to a master base station and the secondary base station; the receiving unit is specifically configured to receive a signal quality measurement result sent by the secondary base station; and the sending unit is specifically configured to report the signal quality measurement result to the TCE.

A fourth aspect of the embodiments of this application provides an MDT measurement apparatus, including a processor and a memory, where the processor is coupled to the memory, the memory is configured to store instructions; and the processor is configured to execute the instructions, so that the apparatus may be able to perform the methods in the first aspect to the third aspect and the implementations of the first aspect to the third aspect.

A fifth aspect of the embodiments of this application provides a computer program product, where the computer program product includes instructions; and when the instructions are run on a computer, the computer is enabled to perform the methods in the first aspect to the third aspect and the implementations of the first aspect to the third aspect.

A sixth aspect of the embodiments of this application provides a computer-readable storage medium. The computer-readable storage medium stores instructions. When the instructions are run on a computer, the computer is enabled to perform the methods in the first aspect to the third aspect and the implementations of the first aspect to the third aspect.

A seventh aspect of the embodiments of this application provides a base station, configured to perform the methods in the first aspect to the third aspect and the implementations of the first aspect to the third aspect.

An eighth aspect of the embodiments of this application provides a communication system, including the base station and the user equipment in any one of the implementations of the first aspect to the third aspect of the embodiments of this application, where the base station is configured to configure MDT measurement for the user equipment.

It can be learned from the foregoing technical solutions that the embodiments of this application have the following advantages:

According to the MDT configuration method provided in the embodiments of this application, because the MDT configuration information includes the first beam configuration information, the base station sends, to the UE based on the first beam configuration information, the MDT measurement configuration message that carries the second beam configuration information. The UE may perform MDT measurement based on the second beam configuration information. The second beam configuration information is the same as the first beam configuration information or the second beam configuration information is configuration information obtained after the first beam configuration information is processed. All measurement results reported by the UE are measurement results based on the same configuration information. Therefore, analysis accuracy may be improved if cell radio signals of the base station are uniformly analyzed based on the measurement results.

DESCRIPTION OF EMBODIMENTS

MDT measurement is performed by UE to automatically collect terminal measurement data. In this way, problems and faults in a wireless network may be detected and resolved. In an NR system, during MDT measurement, the UE may obtain a cell measurement result by measuring a plurality of beams. Because measurement configurations of the UE connected to a same base station are different, the UE may measure different beams, and configuration parameters for obtaining cell measurement results based on beam measurement results are also different. If cell measurement results are obtained based on different measurement configurations of base stations and then cell radio signals of the base stations are uniformly analyzed, accuracy is relatively low.

Embodiments of this application provide an MDT configuration method. In the method, MDT configuration information including beam configuration information is sent to a base station, so that the UE may perform MDT measurement based on the same beam configuration information. Therefore, analysis accuracy may be improved if cell radio signals of the base station are uniformly analyzed based on the measurement results obtained based on the same configuration information.

The MDT configuration method provided in the embodiments of this application is applicable to a plurality of wireless communication systems, for example, may be applied to a new radio (NR) system in a fifth generation (5G)

mobile communication system or a future mobile communication system. This is not limited in embodiments of this application.

The base station in the embodiments of this application may include various apparatuses that provide a communication function for a terminal in a radio access network, for example, may be a macro base station, a micro base station, a relay station, or an access point in various forms. In systems using different radio access technologies, a base station may be named differently. For example, it is referred to as a next generation NodeB (gNB) in a future mobile communication system, or an evolved NodeB (eNodeB) (eNB for short) in a long term evolution (LTE) network. In addition, in a scenario in which an eNB in LTE is connected to a 5th generation core network (5GC), the eNB is also referred to as an ng-eNB, and is connected to the 5GC by an NG interface. A specific technology used by the base station and a specific device form of the base station are not limited in the embodiments of this application.

The UE in the embodiments of this application may include various handheld devices, vehicle-mounted devices, wearable devices, and computing devices that provide a radio communication function or other processing devices connected to a wireless modem, and mobile stations (MS), terminal devices (terminal equipment), and the like in various forms. A specific technology used by the UE and a specific device form of the UE are not limited in the embodiments of this application.

Figure 1:
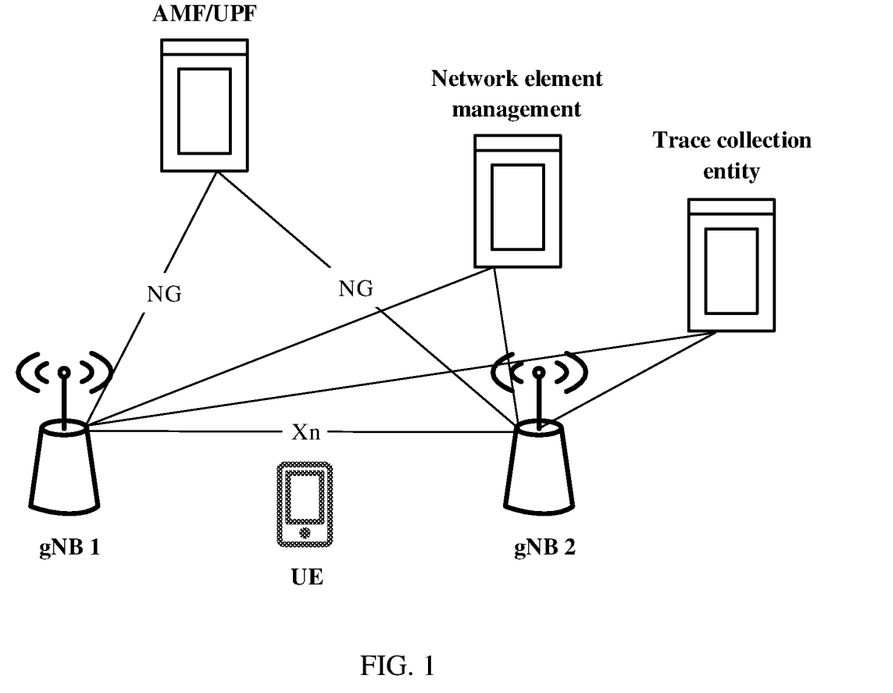
FIG. 1 is a diagram of a system architecture according to an embodiment of this application.

The following uses a 5G mobile communication system as an example for description. FIG. 1 is a diagram of a system architecture according to an embodiment of this application.

gNB 1 and gNB 2 are NR base stations connected to a 5GC, and provide a radio access service for UE. gNB 1 and gNB 2 are connected by an Xn interface, and the gNBs and the 5GC are connected by NG interfaces.

The core network 5GC provides terminal UE with 5G core network functions, including an access and mobility management function (AMF) and a user plane function (UPF). The AMF is a core network control plane network element and is mainly responsible for terminal access and mobility management. The UPF is a core network user plane network element and mainly provides functions such as data packet routing and forwarding and QoS management.

Network element management refers to an operation, administration and maintenance (OAM) network management system and it is mainly responsible for network element configuration. In the embodiments of this application, it may be used to deliver an MDT measurement configuration. It can be referred to as the network management system for short.

A trace collection entity (TCE) is an entity used to collect MDT data. It should be noted that the TCE may be integrated into a network element management entity or a base station entity. This is not limited in the embodiments of this application, and an example in which the TCE exists independently is only used for description.

Figure 2:
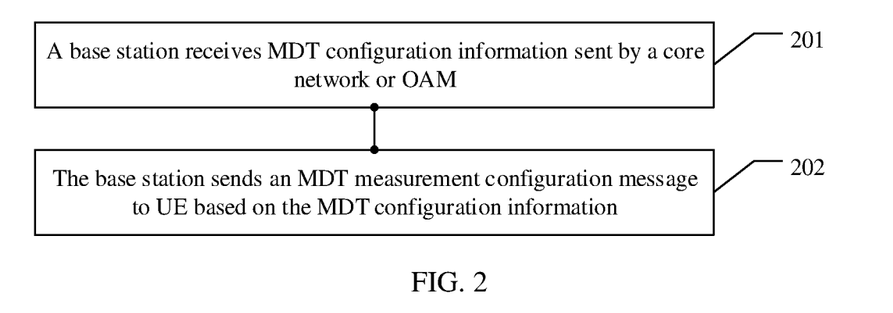
FIG. 2 is a schematic diagram of an embodiment of an MDT configuration method according to an embodiment of this application.

Based on the system architecture diagram shown in FIG. 1, FIG. 2 is a schematic diagram of an embodiment of an MDT configuration method according to an embodiment of this application.

201. A base station receives MDT configuration information sent by a core network or an operation, administration, and maintenance (OAM) network management system.

Either the core network or the OAM may send MDT configuration information to the base station, where the sent MDT configuration information includes first beam configuration information, and the first beam configuration information includes one or more of: a reference signal type, an average quantity of beams of a reference signal, or a reference signal combination threshold. Specific content of the first beam configuration information is not limited in embodiments of the present disclosure.

202. The base station sends an MDT measurement configuration message to UE based on the MDT configuration information.

After obtaining the MDT configuration information, the base station may send the MDT measurement configuration message to the UE based on the MDT configuration information, where the MDT measurement configuration message includes second beam configuration information, and the second beam configuration information is the same as the first beam configuration information or the second beam configuration information is configuration information obtained after the first beam configuration information is processed. The processing herein may be that each parameter in the first beam configuration information is added to the MDT measurement configuration message by changing or converting a parameter name, an information element structure, a value, or the like, so that the MDT measurement configuration message may include one or more parameters in the first beam configuration information, converted values of these parameters, or the like. A specific processing manner is not limited in embodiments of the present disclosure.

Optionally, if the MDT configuration information carries area information for performing MDT measurement, the base station may perform MDT measurement only on the UE in a cell determined based on the area information.

Optionally, the base station may determine, according to a preset rule, UE for which MDT measurement is configured. For example, the base station determines whether the area information carried in the configuration information includes a cell in which the UE is located, and determines that the UE is UE that performs MDT measurement if the area information carried in the configuration information includes the cell in which the UE is located. Alternatively, the base station determines whether the UE subscribes to permission for data collection. If the UE permits data collection, then the base station determines that the UE is UE that performs MDT measurement. A specific preset rule is not limited in embodiments of the present disclosure.

According to the MDT configuration method provided in this embodiment of this application, because the MDT configuration information includes the first beam configuration information, the base station sends, to the UE based on the first beam configuration information, the MDT measurement configuration message that carries the second beam configuration information. The UE may perform MDT measurement based on the second beam configuration information. The second beam configuration information is the same as the first beam configuration information or the second beam configuration information is configuration information obtained after the first beam configuration information is processed. All measurement results reported by the UE are measurement results based on the same configuration information. Therefore, analysis accuracy may be improved if cell radio signals of the base station are uniformly analyzed based on the measurement results.

To facilitate understanding of the technical solutions of this application, the following describes the MDT configuration method in the embodiments of this application by using specific interaction embodiments.

Figure 3:
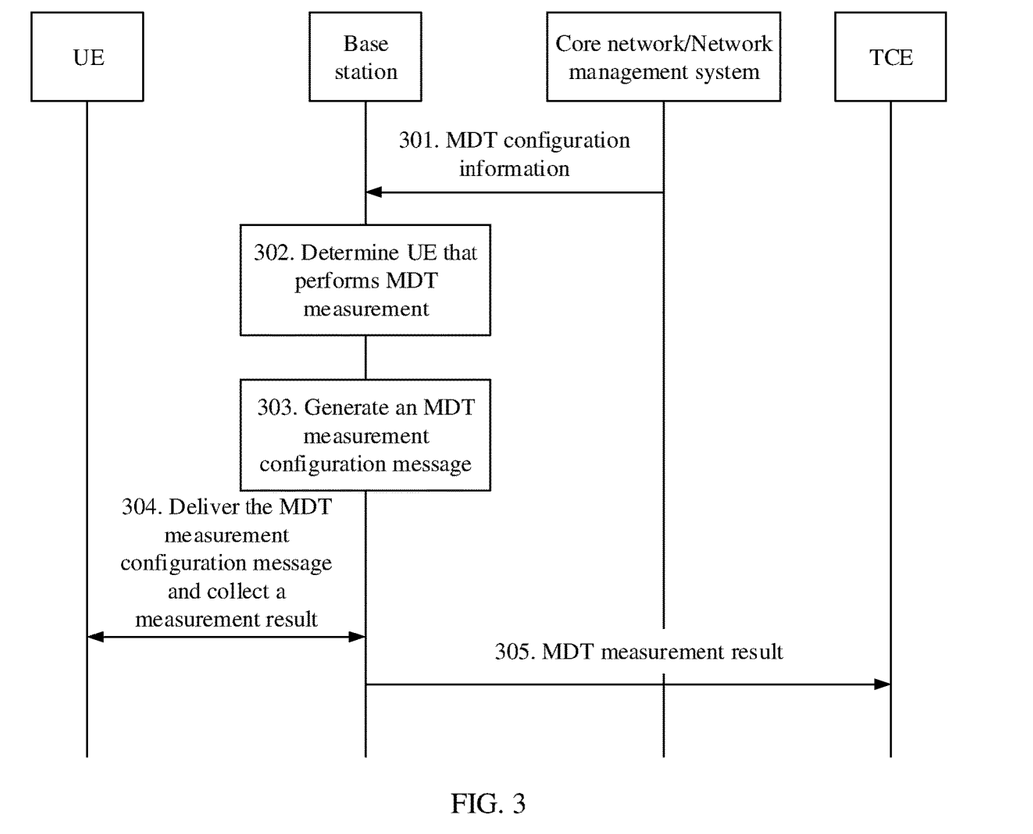
FIG. 3 is an interaction flowchart of an MDT configuration method according to an embodiment of this application.

Based on the system architecture diagram shown in FIG. 1, FIG. 3 is an interaction flowchart of an MDT configuration method according to an embodiment of this application.

301. A core network or a network management system sends MDT configuration information to a base station.

To obtain terminal measurement data, the core network or the network management system may send the MDT configuration information to the base station, where the MDT configuration information is parameter information required for MDT measurement. In this embodiment of this application, the MDT configuration information includes first beam configuration information. The first beam configuration information includes one or more of: a reference signal type, an average quantity of beams of a reference signal, or a reference signal combination threshold.

For example, the reference signal type may be a synchronization signal block (SSB) or a channel state information reference signal (CSI-RS). Herein, types of the SSB are further classified into cell-defining SSB (CD-SSB) and non-cell-defining SSB (non CD-SSB). A specific reference signal type is not limited in embodiments of the present disclosure.

The average quantity of beams of the reference signal is a quantity of candidate beams selected when UE calculates a cell measurement result based on a beam measurement result, and a value is a positive integer, for example, may be 3 or 5. A specific value of the average quantity of beams of the reference signal is not limited in embodiments of the present disclosure.

The reference signal combination threshold is a threshold that needs to be met by signal quality of a candidate beam in a process of obtaining signal quality of a cell based on beam signal quality. The candidate beam is a beam whose signal quality exceeds the threshold, and the signal quality of the cell may be calculated based on the signal quality of the candidate beam. A value of the reference signal combination threshold may be, for example, a reference signal received power threshold, and a specific value of the reference signal combination threshold is not limited herein.

A subcarrier spacing is a subcarrier spacing corresponding to a reference signal, and the terminal measures a beam reference signal corresponding to the subcarrier spacing. The subcarrier spacing may be, for example, 15 kilohertz (kHz), and a specific value is not limited herein.

Optionally, the method may further include whether to report the beam measurement result. For example, 0 indicates that the beam measurement result is not reported, and 1 indicates that the beam measurement result is reported. If the beam measurement result is reported, richer measurement information may be obtained.

302. The base station determines UE that performs MDT measurement.

After the base station receives the MDT configuration information, the base station may determine, according to a preset rule, the UE for which MDT measurement is configured. For example, the base station determines whether area information carried in the configuration information includes a cell in which the UE is located, and determines that the UE is UE that performs MDT measurement if the area information carried in the configuration information includes the cell in which the UE is located. Alternatively, the base station determines whether the UE subscribes to permission for data collection. If the UE permits data collection, then the base station determines that the UE is UE that performs MDT measurement. A specific preset rule is not limited herein.

Optionally, if the MDT configuration information carries area information for performing MDT measurement, the base station may perform MDT measurement only on the UE in the cell determined based on the area information.

303. The base station generates an MDT measurement configuration message.

After determining the UE for which MDT measurement is configured, the base station may deliver an MDT measurement configuration message to the UE based on the MDT configuration information, where the MDT measurement configuration message includes second beam configuration information, and the second beam configuration information is the same as the first beam configuration information or the second beam configuration information is configuration information obtained after the first beam configuration information is processed. The processing herein may be that each parameter in the first beam configuration information is added to the MDT measurement configuration message by changing or converting a parameter name, an information element structure, a value, or the like, so that the MDT measurement configuration message may include one or more parameters in the first beam configuration information, converted values of these parameters, or the like. A specific processing manner is not limited in embodiments of the present disclosure.

The MDT measurement configuration message includes the second beam configuration information, and the second beam configuration information includes one or more of: a reference signal type, reference signal configuration information, an average quantity of beams of a reference signal, and a reference signal combination threshold. The reference signal configuration information is a parameter related to the reference signal, for example, frequency information of the reference signal, and is parameter information in the base station. For example, if the reference signal type carried in the first beam configuration information is an SSB, then the base station may search for corresponding SSB frequency information and add the corresponding SSB frequency information to the second beam configuration information.

It may be understood that the second beam configuration information is corresponding to the first beam configuration information. The base station may configure the second beam configuration information for the UE based on the first beam configuration information.

For example, assume that the first beam configuration information obtained by the base station includes: reference signal type: SSB; average quantity of beams of the reference signal: 3; reference signal combination threshold: reference signal received power (RSRP) 105.

Then, the base station may configure the second beam configuration information as follows: reference signal type: SSB; frequency information of the SSB: 100; subcarrier spacing of the SSB: 15 kHz; SSB combination threshold: RSRP 105; average beam number of the SSB: 3.

The frequency information of the SSB is information obtained by the base station by querying based on the reference signal type SSB in the first beam information.

Optionally, reference signal configuration information such as a timing offset of the SSB may be further included. It may be understood that different reference signal types correspond to different information elements, which are not specifically limited herein.

304. The base station delivers the MDT measurement configuration message and collects a measurement result.

The base station delivers the MDT measurement configuration message to the determined UE, and the UE performs MDT measurement and reports an MDT measurement result to the base station.

It should be noted that the base station that sends the MDT measurement configuration message to the UE may be different from the base station to which the UE reports the MDT measurement result.

305. The base station sends the MDT measurement result to a TCE.

After receiving the MDT measurement result reported by the UE, the base station may report the MDT measurement result to the TCE.

According to the MDT configuration method provided in this embodiment of this application, because the MDT configuration information includes the first beam configuration information, the base station sends, to the UE based on the first beam configuration information, the MDT measurement configuration message that carries the second beam configuration information. The second beam configuration information is the same as the first beam configuration information or the second beam configuration information is configuration information obtained after the first beam configuration information is processed. The UE may perform MDT measurement based on the second beam configuration information. All measurement results of the UE reported to the TCE are measurement results based on the same configuration information. Therefore, analysis accuracy may be improved if cell radio signals of the base station are uniformly analyzed based on the measurement results.

In actual application, MDT measurement is triggered after the core network or the network management system generates the MDT configuration and sends the MDT configuration to the base station, and may also be triggered after the base station may generate the MDT configuration according to a preset rule. Details are described below.

Figure 4:
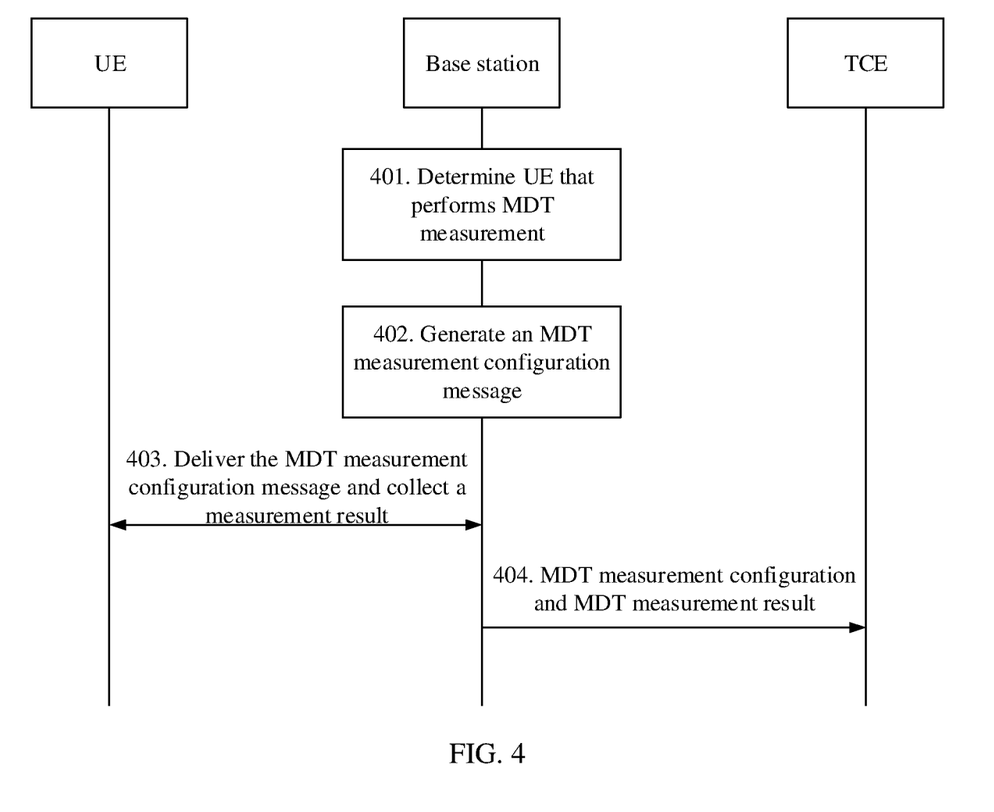
FIG. 4 is another interaction flowchart of an MDT configuration method according to an embodiment of this application.

Based on the system architecture diagram shown in FIG. 1, FIG. 4 is another interaction flowchart of an MDT configuration method according to an embodiment of this application.

401. A base station determines UE that performs MDT measurement.

To obtain terminal measurement data, the base station may trigger the UE to perform MDT measurement. The base station may determine, according to a preset rule, the UE for which MDT measurement is configured. For example, the base station determines whether the UE subscribes to permission for data collection, and determines that the UE is UE that performs MDT measurement if the UE permits data collection. A specific preset rule is not limited herein.

402. The base station generates an MDT measurement configuration message.

The base station may generate the MDT measurement configuration message according to a preset rule or a default parameter. For example, the base station may perform measurement by using a reference signal type CD-SSB by default. A specific rule or default parameter is not limited herein.

The MDT measurement configuration message includes beam configuration information, and the beam configuration information includes one or more of: a reference signal type, an average quantity of beams of a reference signal, or a reference signal combination threshold.

403. The base station delivers the measurement configuration message to the UE and collects a measurement result.

The base station delivers the MDT measurement configuration message to the UE that determines to perform MDT measurement, and the UE performs MDT measurement and reports an MDT measurement result to the base station.

404. The base station sends the MDT measurement configuration and the MDT measurement result to a TCE.

After receiving the MDT measurement result reported by the UE, the base station may report the MDT measurement result and the MDT measurement configuration generated by the base station to the TCE.

According to the MDT configuration method provided in this embodiment of this application, because the MDT configuration information generated by the base station includes the beam configuration MDT measurement configuration message, the UE may perform MDT measurement based on the beam configuration information, and report both the measurement result and the beam configuration information to the TCE. All measurement results reported to the TCE are measurement results based on the same configuration information. Therefore, analysis accuracy may be improved if cell radio signals of the base station are uniformly analyzed based on the measurement result.

In a wireless network, one UE may communicate with a plurality of base stations, which is dual-connectivity (DC). The plurality of base stations may be base stations using a same standard. For example, all are 4G base stations or all are 5G base stations. The base stations may also be base stations using different standards. For example, one is a 4G base station, and the other is a 5G base station. In the embodiments of this application, a specific form of the base station is not limited herein. A network side may provide a communication service for UE by using resources of multiple base stations to provide high-rate transmission for the UE. A base station that has control plane signaling interaction with a core network in a DC is referred to as a master base station (MN), and another base station is referred to as a secondary base station (SN).

Figure 5:
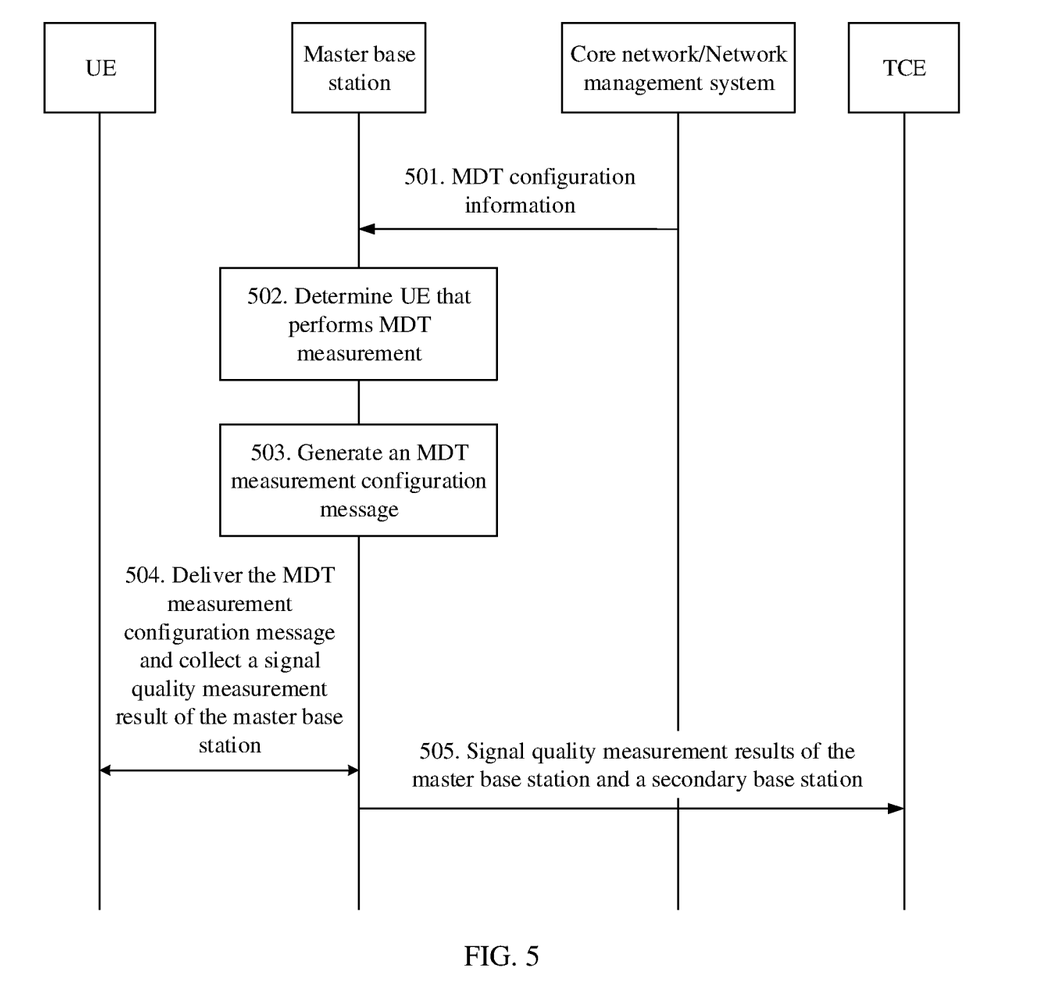
FIG. 5 is another interaction flowchart of an MDT configuration method according to an embodiment of this application.

The MDT configuration method provided in the embodiments of this application may be applicable to a dual connectivity scenario. The following describes how to obtain signal quality of the master base station and the secondary base station when the UE is at a same location in the dual connectivity scenario. In the system architecture diagram shown in FIG. 1, the UE may communicate with gNB 1 and gNB 2. FIG. 5 is another interaction flowchart of an MDT configuration method according to an embodiment of this application.

501. A core network or a network management system sends MDT configuration information to a master base station.

The core network or the network management system may send the MDT configuration information to the base station, where the MDT configuration information includes indication information of signal quality measurement on the master base station and a secondary base station. The indication information is used to indicate the master base station to report signal quality measurement results of the master base station and the secondary base station.

502. The master base station determines UE that performs MDT measurement.

Step 502 is similar to step 302 in the embodiment corresponding to FIG. 3.

503. The master base station generates an MDT measurement configuration message.

After determining the UE for which MDT measurement is configured, the base station may deliver the MDT measurement configuration message to the UE according to the MDT configuration information, where the MDT configuration information further includes the indication information of signal quality measurement on the master base station and the secondary base station. The indication information is used to indicate the UE in a dual connectivity scenario to measure the signal quality of the master base station and the secondary base station and report measurement results.

504. The master base station delivers the MDT measurement configuration message to the UE and collects the signal quality measurement result of the master base station.

When the UE reports a measurement event B1, B2, A3, A4, or A5, the UE reports a signal quality measurement result of a serving cell of the master base station to the master base station. In addition, the UE may report a signal quality measurement result of a serving cell of the secondary base station corresponding to a measurement event delivered by the secondary base station to the master base station.

505. The master base station reports the signal quality measurement results of the master base station and the secondary base station to a TCE.

The master base station reports the signal quality measurement results to the TCE.

According to the MDT configuration method provided in this embodiment of this application, the MDT configuration information includes the indication information of signal quality measurement on the master base station and the secondary base station, and the master base station sends, to the UE, the MDT measurement configuration message that carries the indication information of signal quality measurement on the master base station and the secondary base station. The UE may report the signal quality measurement results of the master base station and the secondary base station according to the MDT measurement configuration message. The TCE may receive the signal quality measurement results of the master base station and the secondary base station that are reported by the master base station, and obtain signal coverage statuses of the master base station and the secondary base station when the UE is at a same location.

Figure 6:
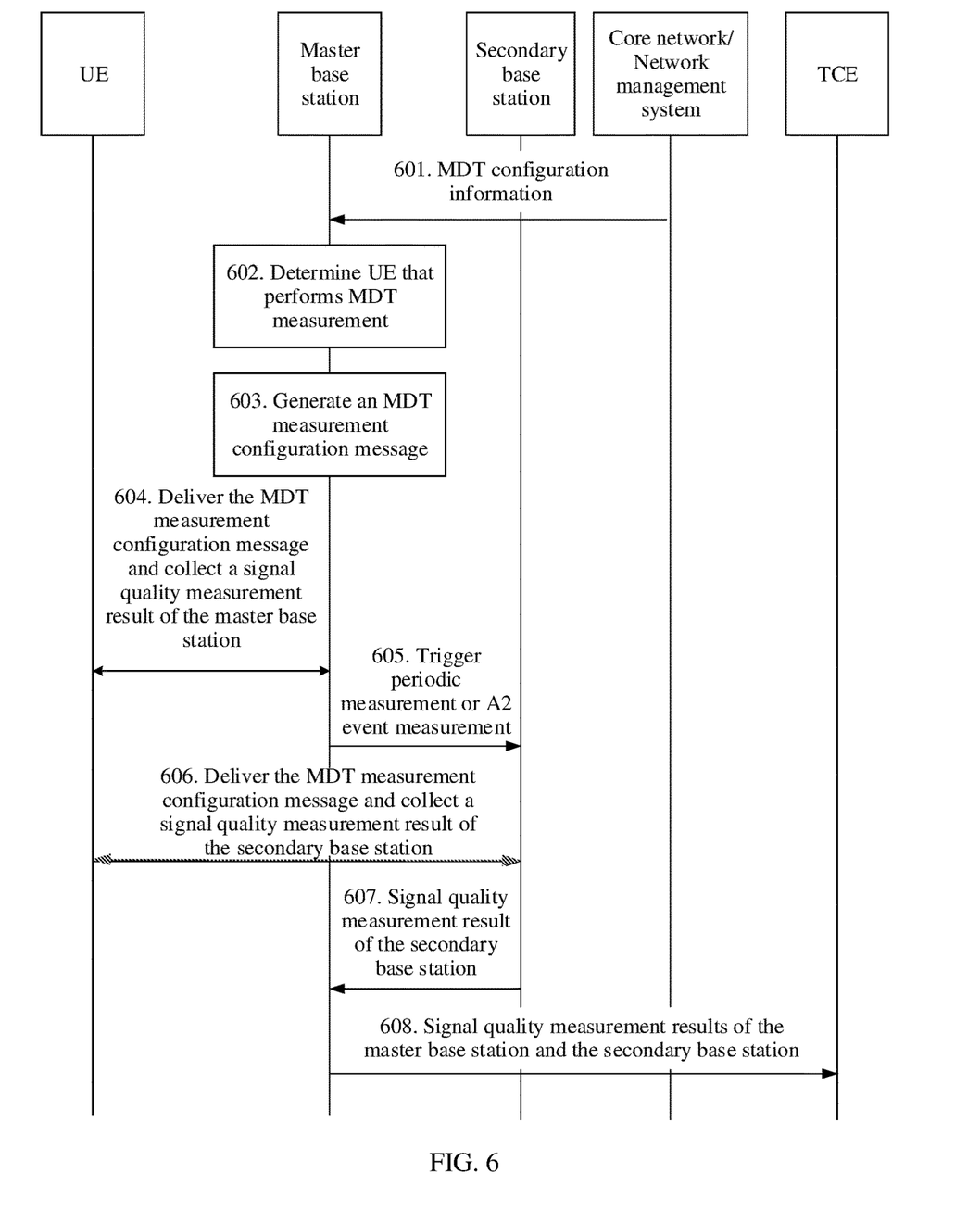
FIG. 6 is another interaction flowchart of an MDT configuration method according to an embodiment of this application.

The following describes how to trigger UE to report signal quality of a master base station and a secondary base station in a dual connectivity scenario. Based on the system architecture diagram shown in FIG. 1, FIG. 6 is another interaction flowchart of an MDT configuration method according to an embodiment of this application.

601. A core network or a network management system sends MDT configuration information to a master base station.

602. The master base station determines UE that performs MDT measurement.

603. The master base station generates an MDT measurement configuration message.

Step 601 to step 603 are similar to step 301 to step 303 in the embodiment corresponding to FIG. 3.

604. The master base station delivers the MDT measurement configuration message to the UE and collects a signal quality measurement result of the master base station.

The master base station delivers the MDT measurement configuration message to the UE determined in step 602, and the UE performs MDT measurement and reports an MDT measurement result to the base station. When the UE meets a condition for periodic measurement or A2 event measurement, the UE sends the obtained signal quality measurement result of the master base station, that is, a signal quality measurement result of a serving cell of the master base station, to the master base station.

605. The master base station triggers a secondary base station to perform periodic measurement or A2 event measurement.

After receiving the MDT configuration information sent by the core network or the network management system, the master base station sends a message to the secondary base station. The message triggers the secondary base station to configure UE to perform periodic measurement or A2 event measurement. For example, the message may be a secondary base station modification message. A specific message type is not limited herein. Optionally, the message may carry some MDT configuration information sent by the core network or the network management system.

It should be noted that there is no strict sequence between steps 604 and 605, and step 604 may be performed first, or step 605 may be performed first. This is not limited herein.

606. The secondary base station delivers measurement to the UE and collects a signal quality measurement result of the secondary base station.

The secondary base station delivers periodic measurement or A2 event measurement to the UE. When the UE meets a condition for periodic measurement or A2 event measurement, the UE sends the obtained signal quality measurement result of the secondary base station, that is, a signal quality measurement result of a serving cell of the secondary base station, to the secondary base station.

607. The secondary base station sends the signal quality measurement result of the secondary base station to the master base station.

The secondary base station sends the signal quality measurement result of the secondary base station reported by the UE to the master base station.

608. The master base station reports the signal quality measurement results of the master base station and the secondary base station to a TCE.

The master base station reports the signal quality measurement result of the secondary base station obtained in step 607 and the signal quality measurement result of the master base station obtained in step 604 to the TCE. The master base station may simultaneously send the signal quality measurement results of the master base station and the secondary base station by using one message, or may separately send the signal quality measurement results of the master base station and the secondary base station by using two messages. This is not limited herein.

It should be noted that, in another possible implementation, after delivering measurement to the UE and collecting the signal quality measurement result of the secondary base station, the secondary base station may directly send signal quality measurement result of the secondary base station to the TCE, and does not need to send the result to the master base station.

It should be noted that, for multi-standard dual connectivity, that is, when one terminal device is simultaneously connected to two base stations using different communication standards, for example, a 4G base station and a 5G base station, there is a dual connectivity scenario referred to as non-standalone (NSA) scenario. A base station using one standard in the NSA scenario, for example, a secondary base station, cannot provide a cell on which the terminal device camps, that is, a terminal device in an idle state cannot camp on a cell of the secondary base station in the NSA scenario, and the terminal device can camp only on a standard corresponding to a master base station. NSA generally means that the master base station is an LTE base station, and the secondary base station is an NR base station. In addition, generally, only the master base station has a control plane connection to a core network or a network management system, that is, only the master base station can receive corresponding MDT configuration information. In this scenario, if an operator wants to obtain a coverage status of a cell using the communication standard corresponding to the secondary base station, step 603 and step 604 in this embodiment may not be performed. That is, the master base station notifies the secondary base station of some MDT measurement configuration information, and the secondary base station configures the UE to perform MDT measurement, or the secondary base station performs partial MDT measurement. Optionally, the MDT configuration information sent by the core network or the network management system to the master base station indicates that MDT measurement is performed only on the secondary base station.

According to the MDT configuration method provided in this embodiment of this application, because the master base station may trigger periodic measurement or A2 event measurement, and the secondary base station may report the signal quality measurement result of the secondary base station, the TCE may obtain the signal quality measurement results of the master base station and the secondary base station of the UE, and obtain overall signal coverage conditions of the master base station and the secondary base station of the UE.

Figure 7:
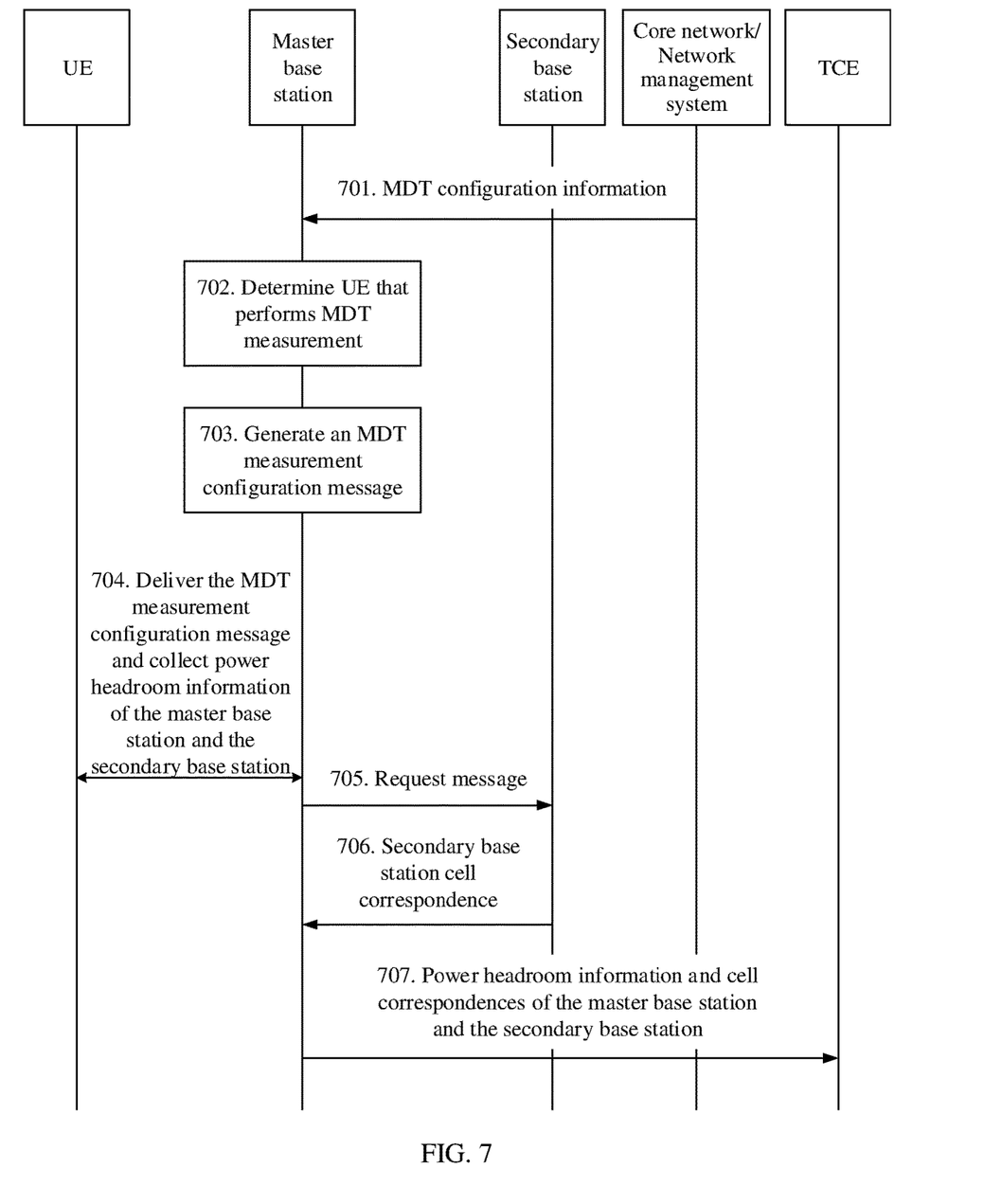
FIG. 7 is another interaction flowchart of an MDT configuration method according to an embodiment of this application.

The following describes a process in which UE reports power headroom information of a master base station and a secondary base station in a dual connectivity scenario. Based on the system architecture diagram shown in FIG. 1, FIG. 7 is another interaction flowchart of an MDT configuration method according to an embodiment of this application.

701. A core network or a network management system sends MDT configuration information to a master base station.

The core network or the network management system may send the MDT configuration information to the base station. In this embodiment, the MDT configuration information includes power headroom measurement, and the measurement is used to indicate the master base station to report power headroom information of a serving cell.

702. The master base station determines UE that performs MDT measurement.

Step 702 is similar to step 302 in the embodiment corresponding to FIG. 3.

703. The master base station generates an MDT measurement configuration message.

After determining the UE for which MDT measurement is configured, the base station may deliver the MDT measurement configuration message to the UE according to the obtained MDT configuration information, where the MDT measurement configuration message includes power headroom measurement.

704. The master base station delivers the MDT measurement configuration message to the UE and collects power headroom information of the master base station and a secondary base station.

The master base station delivers the MDT measurement configuration message to the UE that performs MDT measurement determined in step 702, and the UE performs MDT measurement after receiving the MDT measurement configuration message, where the MDT measurement configuration message includes power headroom measurement of serving cells of the master base station and the secondary base station. The UE obtains power headroom information of the serving cells of the master base station and the secondary base station, and reports the power headroom information to the master base station.

705. The master base station sends a request message to the secondary base station.

After receiving the power headroom information of the master base station reported by the UE, the master base station sends the request message to the secondary base station, where the request message is used to request the secondary base station to feed back a secondary base station cell correspondence, or instruct the secondary base station to perform power headroom measurement.

The secondary base station cell correspondence is a correspondence between a cell index of the serving cell of the secondary base station and a physical cell identifier (PCI) or a cell global identifier (CGI).

706. The secondary base station sends a secondary base station cell correspondence to the master base station.

The secondary base station sends the secondary base station cell correspondence, that is, a correspondence between a cell index of the serving cell of the secondary base station and a PCI or a CGI, to the master base station. For example, the cell index is 3, and a corresponding PCI is 1.

It should be noted that step 705 and step 706 may be performed before or after step 703 or step 704. This is not limited herein.

707. The master base station reports the power headroom information and cell correspondences of the master base station and the secondary base station to a TCE.

The master base station reports the power headroom information of the master base station, the cell correspondence of the master base station, the power headroom information of the secondary base station, and the cell correspondence of the secondary base station to the TCE.

According to the MDT configuration method provided in this embodiment of this application, the master base station may obtain the correspondence between the cell index of the secondary base station and the physical cell identifier (PCI) or the cell global identifier (CGI), and report the power headroom information and cell correspondences of the master base station and the secondary base station. In this way, the TCE can analyze the power headroom information corresponding to the cell.

Figure 8:
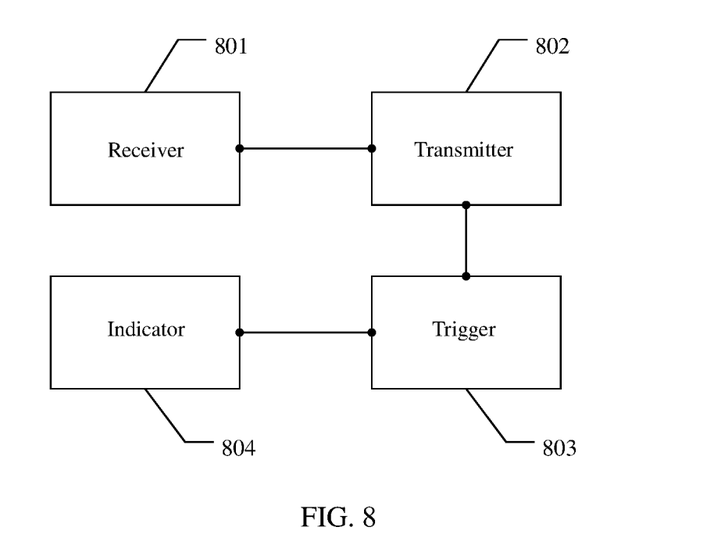
FIG. 8 is a schematic diagram of an embodiment of an MDT measurement apparatus according to an embodiment of this application.

The foregoing describes the MDT configuration method, and the following describes a base station implementing the method. FIG. 8 is a schematic diagram of an embodiment of an MDT measurement apparatus according to an embodiment of this application. The apparatus may be deployed in the base station.

The apparatus provided in this embodiment includes:

a receiver 801, configured to receive MDT configuration information sent by a core network or an operation, administration, and maintenance (OAM) network management system, where the MDT configuration information includes first beam configuration information; and a transmitter 802, configured to send an MDT measurement configuration message to UE based on the MDT configuration information, where the MDT measurement configuration message includes second beam configuration information, and the second beam configuration information is the same as the first beam configuration information or the second beam configuration information is configuration information obtained after the first beam configuration information is processed.

The receiver 801 is further configured to:

receive an MDT measurement result sent by the UE, where the MDT measurement result is obtained by after measurement is performed based on the second beam configuration information; and the base station sends the MDT measurement result to a trace collection entity (TCE)

The apparatus further includes:

a trigger 803, configured to trigger the UE to report signal quality measurement results of a master base station and a secondary base station, where the UE is dually connected to the master base station and the secondary base station.

The transmitter 802 is further configured to report the signal quality measurement results of the master base station and the secondary base station to the trace collection entity (TCE).

The apparatus further includes:

an indicator 804, configured to indicate the secondary base station of the UE to deliver periodic measurement or A2 event measurement, where the UE is dually connected to the master base station and the secondary base station; the receiver 801 is specifically configured to receive the signal quality measurement result sent by the secondary base station; and the transmitter is specifically configured to report the signal quality measurement result to the TCE.

When the UE is dually connected to the master base station and the secondary base station, the apparatus may generally be deployed on the master base station of the UE.

Figure 9:
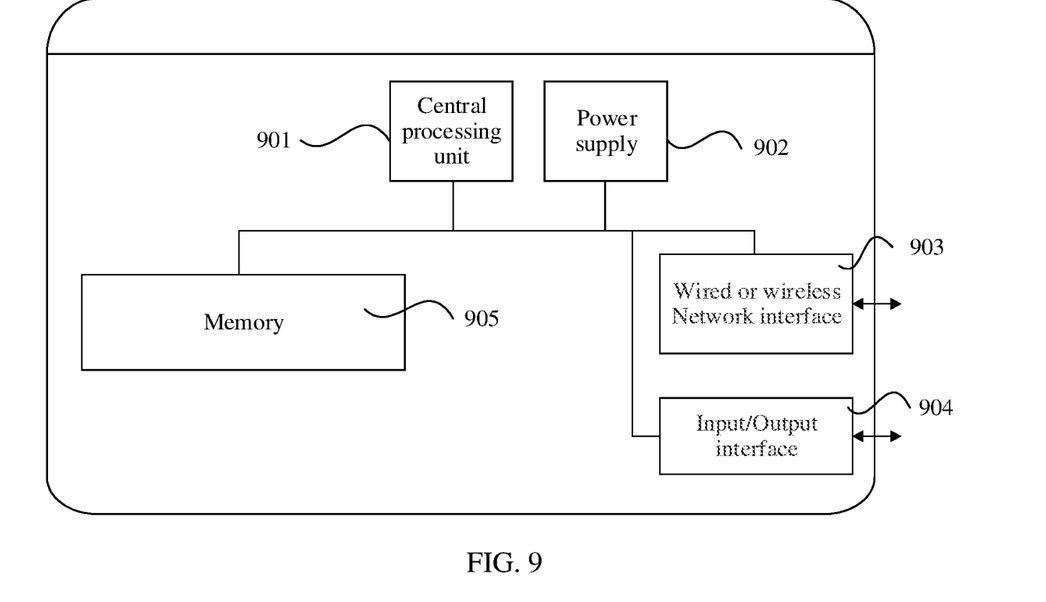
FIG. 9 is a schematic diagram of another embodiment of an MDT measurement apparatus according to an embodiment of this application.

FIG. 9 is a schematic diagram of another embodiment of an MDT measurement apparatus according to an embodiment of this application. The apparatus may be deployed in a base station.

The MDT measurement apparatus may vary greatly with different configurations or performance, and may include one or more processors 901 and a memory 905. The memory 905 stores a program or data.

The memory 905 may be a volatile memory or a non-volatile memory. The processor 901 may communicate with the memory 905, and execute a series of instructions in the memory 905 on the MDT measurement apparatus.

The MDT measurement apparatus may further include one or more power supplies 902, one or more wired or wireless network interfaces 903, and one or more input/output interfaces 904.

For a procedure executed by the processor 901 in the MDT measurement apparatus in this embodiment, refer to the method procedure described in the foregoing method embodiments.

The embodiments of this application further provide a chip. The chip includes at least one interface circuit and at least one processing circuit. The interface circuit is coupled to the processing circuit, and the processing circuit is configured to implement a function of the MDT measurement apparatus in any one of the foregoing method embodiments.

It may be clearly understood by persons skilled in the art that, for the purpose of convenient and brief description, for a detailed working process of the foregoing system, apparatus, and unit, reference may be made to a corresponding process in the foregoing method embodiments.

In the several embodiments provided in this application, it should be understood that the disclosed system, apparatus, and method may be implemented in other manners. The described apparatus embodiments are merely examples. For example, the unit division is merely logical function division, and in actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, in other words, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A minimization of drive tests (MDT) configuration method, comprising:

receiving, by a base station, MDT configuration information sent by a core network or an operation, administration, and maintenance (OAM) network management system, wherein the MDT configuration information comprises first beam configuration information; and sending, by the base station, an MDT measurement configuration message to user equipment (UE) based on the MDT configuration information, wherein the MDT measurement configuration message comprises second beam configuration information, and the second beam configuration information is the same as the first beam configuration information or the second beam configuration information is configuration information obtained after the first beam configuration information is processed, wherein the method further comprises:

after sending the MDT measurement configuration message to the UE based on the MDT configuration information;

receiving, by the base station, an MDT measurement result sent by the UE, wherein the MDT measurement result is obtained after measurement is performed based on the second beam configuration information, and sending, by the base station, the MDT measurement result to a trace collection entity (TCE).

2. The method according to claim 1, wherein the first beam configuration information comprises one or more of:
a reference signal type, an average quantity of beams of a reference signal, or a reference signal combination threshold, the reference signal combination threshold being a threshold for signal quality of a candidate beam of a reference signal.

3. The method according to claim 1, wherein the second beam configuration information comprises one or more of:
a reference signal type, reference signal configuration information, an average quantity of beams of a reference signal, or a reference signal combination threshold, the reference signal combination threshold being a threshold for signal quality of a candidate beam of a reference signal.

4. The method according to claim 1, wherein the MDT configuration information comprises area information; and the method further comprises determining, by the base station, the UE that performs MDT measurement based on the area information.

5. The method according to claim 1, wherein the MDT configuration information comprises indication information of signal quality measurement on a master base station and a secondary base station; and
the method further comprises:
triggering, by the base station, the UE to report signal quality measurement results of the master base station and the secondary base station, wherein the UE is dually connected to the master base station and the secondary base station.

6. An apparatus, comprising:
at least one processor, and a memory storing instructions, that when executed by the at least one processor, cause the apparatus to perform operations comprising:
receiving minimization of drive tests (MDT) configuration information sent by a core network or an operation, administration, and maintenance (OAM) network management system, wherein the MDT configuration information comprises first beam configuration information; and
sending an MDT measurement configuration message to user equipment (UE) based on the MDT configuration information, wherein the MDT measurement configuration message comprises second beam configuration information, and the second beam configuration information is the same as the first beam configuration information or the second beam configuration information is configuration information obtained after the first beam configuration information is processed, wherein the operations further comprise:
after sending the MDT measurement configuration message to the UE based on the MDT configuration information;
receiving an MDT measurement result sent by the UE, wherein the MDT measurement result is obtained after measurement is performed based on the second beam configuration information, and
sending the MDT measurement result to a trace collection entity (TCE).

7. The apparatus according to claim 6, wherein the MDT configuration information comprises indication information of signal quality measurement on a master base station and a secondary base station; and the operations further comprise:
triggering the UE to report signal quality measurement results of the master base station and the secondary base station, wherein the UE is dually connected to the master base station and the secondary base station.

8. The apparatus according to claim 6, wherein the first beam configuration information comprises one or more of:
a reference signal type, an average quantity of beams of a reference signal, or a reference signal combination threshold, the reference signal combination threshold being a threshold for signal quality of a candidate beam of a reference signal.

9. The apparatus according to claim 6, wherein the second beam configuration information comprises one or more of:
a reference signal type, reference signal configuration information, an average quantity of beams of a reference signal, or a reference signal combination threshold, the reference signal combination threshold being a threshold for signal quality of a candidate beam of a reference signal.

10. The apparatus according to claim 6, wherein the MDT configuration information comprises area information; and the operations further comprise:
determining the UE that performs MDT measurement based on the area information.

11. A non-transitory storage medium comprising computer-executable instructions that, when executed, cause a first radio access network node to perform operations comprising:
receiving minimization of drive tests (MDT) configuration information sent by a core network or an operation, administration, and maintenance (OAM) network management system, wherein the MDT configuration information comprises first beam configuration information; and
sending an MDT measurement configuration message to user equipment (UE) based on the MDT configuration information, wherein the MDT measurement configuration message comprises second beam configuration information, and the second beam configuration information is the same as the first beam configuration information or the second beam configuration information is configuration information obtained after the first beam configuration information is processed, wherein the operations further comprise:
after sending the MDT measurement configuration message to the UE based on the MDT configuration information:
receiving an MDT measurement result sent by the UE, wherein the MDT measurement result is obtained after measurement is performed based on the second beam configuration information, and
sending the MDT measurement result to a trace collection entity (TCE).

12. The non-transitory storage medium according to claim 11, wherein the MDT configuration information comprises area information; and the operations further comprise:
determining the UE that performs MDT measurement based on the area information.

13. The non-transitory storage medium according to claim 11, wherein
the MDT configuration information comprises indication information of signal quality measurement on a master base station and a secondary base station; and the operations further comprise:

triggering the UE to report signal quality measurement results of the master base station and the secondary base station, wherein the UE is dually connected to the master base station and the secondary base station.

14. The non-transitory storage medium according to claim 11, wherein the first beam configuration information comprises one or more of:
a reference signal type, an average quantity of beams of a reference signal, or a reference signal combination threshold, the reference signal combination threshold being a threshold for signal quality of a candidate beam of a reference signal.

15. The non-transitory storage medium according to claim 11, wherein the second beam configuration information comprises one or more of:
a reference signal type, reference signal configuration information, an average quantity of beams of a reference signal, or a reference signal combination threshold, the reference signal combination threshold being a threshold for signal quality of a candidate beam of a reference signal.

* * * * *